United States Patent [19]

Schulze

[11] Patent Number: 5,029,474
[45] Date of Patent: Jul. 9, 1991

[54] TRANSDUCER AND METHOD FOR ACOUSTIC EMISSION (AE) TESTING

[75] Inventor: Guenther Schulze, Fuerth, Fed. Rep. of Germany

[73] Assignee: Siemens Aktiengesellschaft, Munich, Fed. Rep. of Germany

[21] Appl. No.: 333,555

[22] Filed: Apr. 5, 1989

[30] Foreign Application Priority Data

Apr. 5, 1988 [DE] Fed. Rep. of Germany ....... 3811381

[51] Int. Cl.$^5$ .......................................... G01N 29/14
[52] U.S. Cl. ......................................... 73/587; 73/644; 73/654
[58] Field of Search ................. 73/587, 517 B, 516 R, 73/652, 644, 654; 310/326, 328, 329

[56] References Cited

U.S. PATENT DOCUMENTS

| 3,351,787 | 11/1967 | Kistler | 310/329 |
|---|---|---|---|
| 3,968,055 | 7/1976 | Palmer | 252/506 |
| 3,969,927 | 7/1976 | Yoshida et al. | 73/587 |
| 3,973,152 | 8/1976 | Karplus | 310/8.3 |
| 4,011,472 | 3/1977 | Feng | 73/587 |
| 4,189,655 | 2/1980 | Bruel | 73/516 |
| 4,197,478 | 4/1980 | Silvus, Jr. | 310/326 |
| 4,347,743 | 9/1982 | Rausche et al. | 73/654 |
| 4,447,755 | 5/1984 | Ghiurea | 310/329 |
| 4,738,137 | 4/1988 | Sugg et al. | 73/587 |
| 4,769,571 | 9/1988 | Habeger, Jr. et al. | 73/644 |

OTHER PUBLICATIONS

Patent Abstracts of Japan, vol. 8, No. 219, JP-A-5-9-102126.

Shock and Vibration Measurement Technology Seminer, presented by Endevco Dynamic Instrument Division, Oct. 1976.

Primary Examiner—Hezron E. Williams
Assistant Examiner—Rose M. Finley
Attorney, Agent, or Firm—Herbert L. Lerner; Laurence A. Greenberg

[57] ABSTRACT

A transducer acoustic emission testing of a structural part includes a commercially available accelerometer having at least one piezoelectric element and one seismic mass. The accelerometer is typically tuned to a resonant frequency substantially between 1 kHz and 100 kHz. The accelerometer is coupled to the structural part in a frequency range substantially from 0.1 MHz to 2 Mhz.

12 Claims, 1 Drawing Sheet

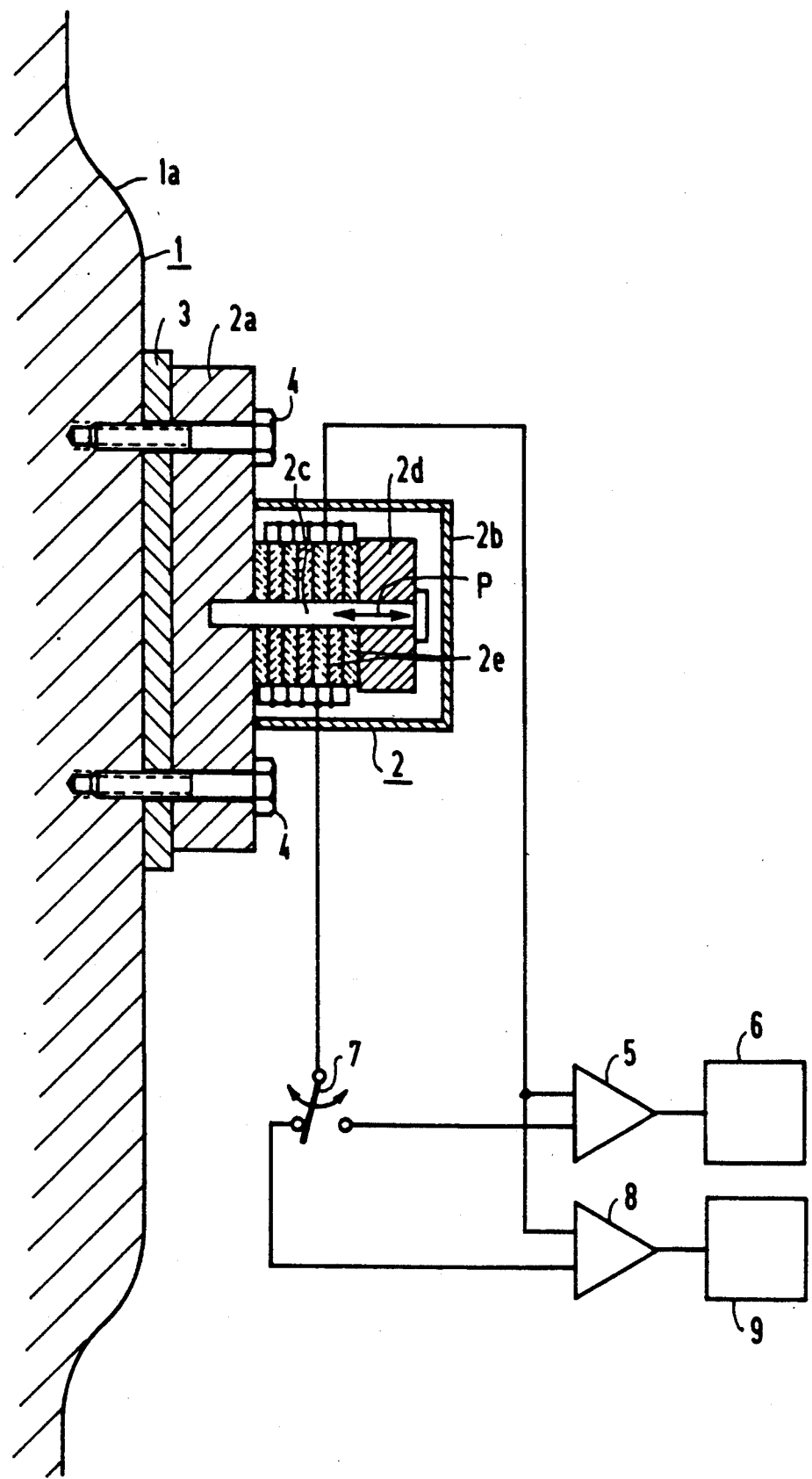

TRANSDUCER AND METHOD FOR ACOUSTIC EMISSION (AE) TESTING

The invention relates to a transducer and to a method for acoustic emission testing of a structural part, in particular a reactor pressure vessel.

In acoustic emission testing, high-frequency AE signals, typically between 0.1 MHz and 2 MHz, that propagate in the structural part, can be recorded at the surface of the structural part by a suitable transducer.

In the prior art, a sharp distinction is made among transducers for acoustic emission, for ultrasonics and for structure-borne sound, or vibration. While the frequency range of acoustic emission extends from 0.1 MHz to 2 MHz, the ultrasonic frequency band extends from 1 MHz to approximately 20 MHz, and the vibration range extends between 1 kHz and approximately 10 kHz.

The transducer known from U.S. Pat. No. 3,968,055 is an ultrasonic transducer that is an ultrasonic receiver and transmitter at the same time.

Accelerometers, which are for instance known from "Mechanical Vibration and Shock Measurements" by Professor Jens Trampe Broch, October, 1980, and from "Piezoelektrische Messtechnik" [Piezoelectric Measuring Technology] by J. Tichy and G. Gautschi, 1980, are suitable transducer for structure borne sound or vibration. A typical commercially available accelerometer includes at least one piezoelectric element and one seismic mass. It is typically tuned to a resonant frequency between 1 kHz and 100 kHz, so that incoming acoustic waves incite the seismic mass to vibrate. The vibrations are converted by one or more piezoelectric elements into electrical signals, which are then evaluated.

A conventional acoustic emission transducer is substantially formed of a piezoelectric element, intended to be coupled to a structural part through a couplant. A typical acoustic emission transducer does not have a seismic mass. Acoustic waves of suitable frequency are converted directly into electrical signals in the piezoelectric element. In order to enable acoustic waves from the structural part to reach a conventional acoustic emission transducer, some coupling with couplants, such as grease, is necessary.

None of the conventional couplants are suitable for very high temperatures, such as typically prevail in the vicinity of primary loop components of a nuclear power plant, for instance. Previously known acoustic emission transducers have therefore not been usable for long-term operation with such primary loop components. Therefore the known transducers are installed anew before each acoustic emission inspection and removed again afterward. The AE transducers and couplants are only briefly exposed, such as for less than 50 hours, to a temperature of approximately 110° C.

The required re-instrumentation and later removal of the AE transducer entail considerable technical effort and high costs. Installing the AE transducers and removing them from primary loop components of a nuclear power plant, such as the reactor pressure vessel, requires expensive and complicated manipulators, because of the radiation exposure and the high temperature. Even with complicated manipulators, however, coupling of the probes cannot be performed as reliably as can be done by hand. A temperature-resistant coupling of the probes that permits operation over a relatively long period of time is therefore sought.

Those skilled in the art had previously assumed that for high frequencies, that is frequencies above 0.1 MHz, acoustic emission transducers always had to be used, while for low frequencies, that is those below approximately 10 KHz, only accelerometers should be used.

It is accordingly an object of the invention to provide a transducer and method for acoustic emission testing, which overcomes the hereinbefore-mentioned disadvantages of the heretoforeknown methods and devices of this general type, which are capable of emitting an AE signal in the frequency range from 100 kHz to 2 MHz and which can be used for long-term operation even at ambient temperature conditions of the kind that prevail in the vicinity of the primary loop in the operation of a nuclear power plant, on the order of 320° C., for example. Complicated installation and removal of transducers for each measurement series should no longer be required.

With the foregoing and other objects in view there is provided, in accordance with the invention, a transducer for acoustic emission testing of a structural part, such a reactor pressure vessel, comprising a commercially available accelerometer including at least one piezoelectric element and one seismic mass, the accelerometer being typically tuned to a resonant frequency substantially between 1 kHz and 100 kHz, and means for coupling the accelerometer to the structural part in a frequency range substantially from 0.1 MHz to 2 MHz.

With the accelerometer, which is fundamentally different in construction from a conventional acoustic emission transducer, unexpectedly AE signals between 0.1 MHz and 2 MHz can be recorded quite well at a structural part, when the aforementioned suitable couplant is used. The advantage of such a method and device is that since an accelerometer is more resistant than a conventional AE transducer, the transducer can remain on the structural part continuously, even at very high temperatures and when exposed to radiation.

With the transducer, an acoustic emission test can be performed at any time on the primary loop of a nuclear power plant or in some other nuclear system. Complicated re-installation and removal of AE transducers at the primary loop each time a test is to be performed is no longer necessary. As a result, complicated and expensive manipulators are no longer necessary either. Moreover, an improved coupling of the transducer is attained, since installation is necessary only once, prior to putting the plant into operation, and this installation can be performed by hand, since the region of the primary loop is accessible to personnel before the plant is put into operation. Later installation by a manipulator is unnecessary.

Finally, the permanent instrumentation that is thus possible for the first time makes it possible to monitor or test components that previously were difficult to test with the acoustic emission testing method. For example, mixed austenite-ferrite seams can be monitored by a permanent monitoring means.

Accelerometers have been used successfully for a long time for vibration monitoring systems. The vibration frequency range tested is between approximately 0.1 kHz and 20 kHz, clearly below the resonant frequency of the transducer. For this purpose, a simple firm mechanical coupling of the accelerometer to the structural part to be tested is sufficient. Even an air gap between the structural part and the accelerometer does not prevent good measurement results from being obtained.

In order to enable the use of an accelerometer for acoustic emission testing, where high-frequency AE waves are to be recorded, suitable couplants are provided for coupling the accelerometer to the structural part mechanically and acoustically.

In accordance with another feature of the invention, the couplant is in the form of a soft metal sheet, or merely a central pin or a central screw. If a soft metal sheet is used, the accelerometer is pressed against the structural part by a screw connection with the structural part, plastically deforming the soft metal sheet. The material of which the sheet is formed is pressed into any uneven areas of the surface of the structural part and of the contact surface of the accelerometer. Since all of the unevenness is completely filled, good acoustical coupling between the accelerometer and the structural part in the frequency range of acoustic emission between approximately 0.1 MHz and approximately 2 MHz is attained. This coupling method is suitable for high temperatures and permanent coupling.

In accordance with a further feature of the invention, the soft metal sheet disposed between the structural part and the acceleration probe is formed of a material from the group consisting of gold, silver, nickel and aluminum. These materials are readily deformable.

In accordance with an added feature of the invention, there is provided a preamplifier connected to the accelerometer and operating in the frequency range of acoustic emission, for instance between 0.1 MHz and 2 MHz, and an evaluation unit connected to the preamplifier.

The amplifiers that are conventionally connected to accelerometers, are unsuitable for use in acoustic emission testing, because their frequency range extends only to approximately 200 kHz. Typically, however, they are used only up to approximately 20 kHz. The evaluation of acoustic emission signals becomes possible through the use of preamplifiers operating at higher frequencies. For this purpose, the output of the preamplifier is connected to the evaluation unit.

In accordance with an additional feature of the invention, there are provided means for securing the accelerometer to the structural part, while pressing the couplant against the surfaces of the structural part and of the accelerometer in such a manner that coupling for the frequency range of 0.1 MHz to 2 MHz is assured.

In accordance with yet another feature of the invention, the securing means are in the form of a screw connection having screws. The device may also be a magnet of suitable dimensions.

In accordance with yet a further feature of the invention, the couplants are in the form of a gel-like medium, such as grease, instead of a soft metal sheet, if the ambient temperature permits.

In accordance with yet an added feature of the invention, the accelerometer includes a base plate, a seismic mass, a pin extending between the base plate and the seismic mass, and a plurality of piezoelectric elements disposed on the pin between the base plate and the seismic mass. In accordance with yet an additional feature of the invention, the pin is screwed into both the base plate and the seismic mass. In accordance with still another feature of the invention, the base plate, the pin and the seismic mass are each formed of metal. This construction assures good measurement results.

In accordance with still a further feature of the invention, the accelerometer has an output, and there is provided a reversing switch connected to the output, and an evaluation unit for high frequency and an evaluation unit for low frequency both being connected to the reversing switch for selectively connecting one of the evaluation units to the output.

In accordance with still an added feature of the invention, the accelerometer has an output, and there is provided a low-pass filter connected to the output, an evaluation unit for low frequency connected to the low-pass filter, a high-pass filter connected to the output, and an evaluation unit for high frequency connected to the high-pass filter.

The advantage of providing these two circuits is that the accelerometer used can be used in the same way for acoustic emission testing and additionally, in accordance with its original purpose, for vibration testing.

With the objects of the invention in view, there is also provided a method for testing a structural part with a transducer for acoustic emission testing, which comprises coupling one commercially available accelerometer including at least one piezoelectric element and one seismic mass and being typically tuned to a resonant frequency substantially between 1 kHz and 100 kHz, to the structural part with couplants for a frequency range substantially from 0.1 MHz to 2 MHz, and testing the structural part with the accelerometer.

This makes it possible for acoustic emission waves to be recognized in the conventional accelerometer, and for a corresponding AE signal to be emitted. Since a conventional accelerometer and the couplants used are more temperature resistant than a conventional acoustic emission transducer, an acoustic emission test can be performed with a permanently installed transducer according to the invention, even in areas of high ambient temperature, for instance at the primary loop of a nuclear power plant.

For example, in accordance with a concomitant mode of the invention, there is provided a method which comprises successively performing acoustic emission testing and permanent vibration monitoring with the same one accelerometer, if two evaluation units are used one after another. Accordingly, only one transducer is needed for tests and monitoring that previously required two separate probes, namely an acoustic emission transducer and an a vibration transducer.

In particular, the transducer according to the invention attains the advantage that in the vicinity of higher temperatures, for instance in the vicinity of the primary loop of a nuclear power plant, acoustic emission tests can be performed at any time, since because of their temperature resistance such transducers can remain installed permanently. They need not be removed after each test and re-installed for another test later, for operations which required complicated manipulators because of the exposure to radiation.

Other features which are considered as characteristic for the invention are set forth in the appended claims.

Although the invention is illustrated and described herein as embodied in a transducer and method for acoustic emission testing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, cross-sectional and schematic view of a transducer according to the invention.

Referring now in detail to the single FIGURE of the drawing, there is seen a structural part 1 in the vicinity of the primary loop of a nuclear power plant, for instance at the reactor pressure vessel, which has a formed-on portion 1a or a thickening, which has been produced at the time that the structural part 1 was manufactured. An accelerometer 2 which is known in the prior art is disposed on the formed-on portion 1a.

The accelerometer 2 includes a cylindrical base plate 2a of metal, on which a cup-shaped housing 2b is centrally disposed. Located inside the housing 2b is a pin 2c, which may be made of metal. One end of the pin 2c is centrally embedded or set into the base plate 2a and secured there, whereas the other end has a seismic mass 2d thereon. The seismic mass 2d is a body having a mass which is substantially greater than the mass of the pin 2c. The seismic mass 2d shown in the drawing is a cylindrical body of metal, with a diameter which is substantially greater than the diameter of the pin 2c. A plurality of piezoelectric elements 2e that fill up the spacing between the mass 2d and the base plate 2a are disposed beside one another on the pin 2c, between the seismic mass 2d, which is capable of vibrating, and the base plate 2a. When used as an accelerometer, the seismic mass 2d vibrates relative to the structural part 1 in the direction of the double arrow p. The piezoelectric elements 2e convert the vibrations of the seismic mass 2d into electrical signals.

When the accelerometer 2 is used as a acoustic emission probe, a foil or soft sheet 3 of metal, for instance gold, is located between the base plate 2a of the accelerometer 2 and the surface of the formed-on portion 1a of the structural part 1, as couplant. The couplant may also be a gel-like medium, such a grease. The foil may also be formed of silver or nickel or aluminum. The base plate 2a of the acclerometer 2 is connected by screws 4 to the formed-on portion 1a of the structural part 1 with the sheet 3 located therebetween. The soft sheet 3 is plastically deformed by the pressure of the screw connection. The soft sheet 3 fills out any remaining unevenness in the machined surface of the formed-on portion 1a of the structural part 1 and of the surface of the base plate 2a. When the accelerometer 2 is used as an acoustic emission transducer, the seismic mass 2d remains at rest. The acoustic emission signals are received directly in the piezoelectric elements 2e. In order to evaluate the signals received, the piezoelectric elements 2e are connected to an evaluation unit 6 through a preamplifier 5 suitable for frequencies above 0.1 MHz.

During operation of the transducer, acoustic emission in the frequency range between 0.1 MHz and approximately 2 MHz passes from the structural part 1 at the formed-on portion 1a, through the sheet 3 into the accelerometer 2. The acoustic waves are converted by the piezoelectric elements 2e into electrical oscillations, they pass through the preamplifier 5 and are recorded by the evaluation unit 6.

In order to enable the use of the accelerometer 2 for recording vibration sound as well, the piezoelectric elements 2e should be selectively connected by a switch 7 with the preamplifier 5 and the evaluation unit 6, or with a preamplifier 8 and an evaluation unit 9 for signals in the range between 1 kHz and approximately 20 kHz. Furthermore, the evaluation unit 6 can be connected through a high-pass filter and the evaluation unit 9 can be connected through a low-pass filter to the piezoelectric elements 2e. In that case, the switch 7 is unnecessary.

I claim:

1. Transducer having an acoustic emission frequency range for acoustic emission testing of a structural part, comprising a commercially available accelerometer including at least one piezoelectric element and one seismic mass coupled to said piezoelectric element, said accelerometer being tuned to a resonant frequency between 1 kHz and 100 kHz, and coupling means for coupling said accelerometer to the structural part, said coupling means operating to extend said frequency range from 0.1 MHz to 2 MHz, wherein said coupling means are in the form of a soft metal sheet.

2. Transducer according to claim 1, wherein said soft metal sheet is formed of a material selected from the group consisting of gold, silver, nickel and aluminum.

3. Transducer according to claim 1, including a preamplifier connected to said accelerometer and operating in the acoustic emission frequency range, and an evaluation unit connected to said preamplifier.

4. Transducer according to claim 1, wherein said accelerometer has an output, and including a reversing switch connected to said output, and an evaluation unit for high frequency and an evaluation unit for low frequency both being connected to said reversing switch for selectively connecting one of said evaluation units to said output.

5. Transducer according to claim 1, wherein said accelerometer has an output, and including a low-pass filter connected to said output, an evaluation unit for low frequency connected to said low-pass filter, a high-pass filter connected to said output, and an evaluation unit for high frequency connected to said high-pass filter.

6. Transducer according to claim 1, including means for securing said accelerometer to the structural part.

7. Transducer according to claim 6, wherein said securing means are in the form of a screw connection having screws.

8. Transducer having an acoustic emission frequency range for acoustic emission testing of a structural part, comprising a commercially available accelerometer including at least one piezoelectric element and one seismic mass coupled to said piezoelectric element, said accelerometer being tuned to a resonant frequency between 1 kHz and 100 kHz, and coupling means for coupling said accelerometer to the structural part, said coupling means operating to extend said frequency range from 0.1 MHz to 2 MHz, wherein said coupling means are in the form of a gel-like medium.

9. Transducer according to claim 8, wherein said gel-like medium is grease.

10. Transducer according to claim 8, wherein said accelerometer includes a base plate, a seismic mass, a pin extending between said base plate and said seismic mass, and a plurality of piezoelectric elements attached to said pin between said base plate and said seismic mass.

11. Transducer according to claim 10, wherein said pin is screwed into both said base plate and said seismic mass.

12. Transducer according to claim 11, wherein said base plate, said pin and said seismic mass are each formed of metal.

* * * * *